Figure 1:
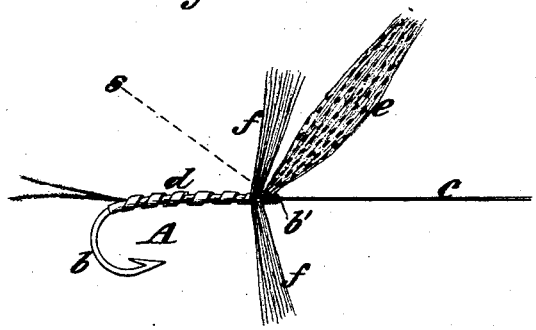

(No Model.)

T. B. MILLS.
ARTIFICIAL FLY.

No. 361,965. Patented Apr. 26, 1887.

Witnesses:
C. Sundgren
Emil Herter

Inventor:
Thomas Bate Mills
by his Attys
Brown & Hall

UNITED STATES PATENT OFFICE.

THOMAS BATE MILLS, OF BROOKLYN, NEW YORK.

ARTIFICIAL FLY.

SPECIFICATION forming part of Letters Patent No. 361,965, dated April 26, 1887.

Application filed July 17, 1886. Serial No. 208,291. (No model.)

*To all whom it may concern:*

Be it known that I, THOMAS BATE MILLS, of Brooklyn, in the county of Kings and State of New York, have invented a new and useful Improvement in Artificial Flies or Fly-Hooks, of which the following is a specification.

This invention relates to artificial flies which are employed in angling, and which consist of fish-hooks so dressed as to give them the appearance of flies or other insects. In such fly-hooks the shank or stem of the hook is commonly wound or otherwise covered to resemble the body of a fly or insect, and it has projecting from it flexible portions made of feathers or other materials, representing wings, and also, usually, the hackle of the insect.

In order to produce a fly which may be used with the greatest success, the flexible portions representing the wings and hackle should be so arranged and secured to the hook that they will not, when the hook is drawn through the water, lap closely back upon the body portion, and thereby destroy the life like appearance of the fly, but will retain a position more or less erect upon the body, and by their flexibility and elasticity will be given a rising-and-falling or vibrating movement as the fly is drawn through the water by intermittent jerks. It is also necessary to the most successful use that the flexible portions, as they are deflected rearward by the drawing of the fly through the water, shall not project greatly beyond the curve or bend and barb of the hook, as, if this is the case, the fish will be liable to strike the rear portion of the fly and miss the bend and barb of the hook entirely.

My invention relates solely to those flies in which the flexible wing portions spring from or are secured to that end of the shank or stem of the hook which is most distant from the curve or bend of the hook, and which is therefore the forward end of the hook when the hook is drawn toward the angler. In all those flies heretofore made, and in which the flexible portions spring from the end of the body which is most distant from the bend or curve of the hook, such flexible portions have had, in their normal condition, an inclination rearward from their root or point of attachment and at an acute angle relatively to the body, and consequently, when such flies are drawn through the water, the resistance tends to fold the wing portions closely down upon the body, and to thus destroy the life-like appearance of the fly, which is essential to successful angling, although such wing portions do not project materially beyond the bend or curve of the hook, and hence are not liable to the objection above referred to—namely, that the fish would strike the fly without touching the hook.

My invention consists in the combination, with a hook proper, having on its stem or shank an imitation of the body of a fly, of wing portions springing from the end of the body which is most distant from the curve or bend of the hook and at an angle to the body as great or greater than a right angle, as distinguished from a fly in which the wing portions are inclined rearward and along the body from their point of attachment.

According to my invention I may secure the wing portions in such a manner that they will project at right angles to the body when in their normal condition, or I may attach such wing portions so that in their normal condition they will be inclined forward from their point of attachment and away from the bend or curve of the hook, thereby making an obtuse angle with the body of the fly. Whether the angle which the wing portions form with the body portion be a right angle or an angle greater than a right angle, and therefore more or less obtuse relatively to the body, will depend on the degree of flexibility and elasticity which the wing portions have. Where such wing portions are comparatively stiff and highly elastic, they may project from the body at a right angle thereto, and such angle will be increased beyond a right angle in proportion as the stiffness and elasticity of the wing portions are reduced.

According to my invention I also make the flexible portions of the fly, other than the wings, and which represent the hackle, inclined correspondingly to the wing portions.

Figure 2:
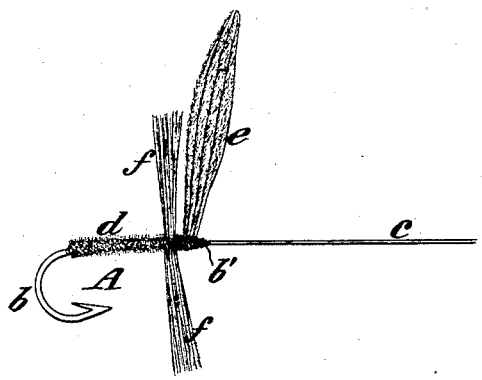

In the accompanying drawings, Figure 1 represents a fly-hook embodying my invention, and having the wing portions inclined forward relatively to the body of the insect at an obtuse angle very much greater than a right angle; and Fig. 2 represents a fly also embodying my invention, and in which the wing portions have only a very slight inclination forward beyond a position at right angles to the body.

Similar letters of reference designate corresponding parts in both the figures.

A designates the hook proper, comprising the bend or curve $b$, terminating in the usual barb, and the stem or shank $b'$, to which the gut or line portion $c$ may be attached. The stem or shank $b'$ of the hook is wound with bright or other colored material, or is otherwise covered in imitation of the body $d$ of a fly; and $e$ $f$ designate the wing portions and hackle, which are all flexible. These flexible portions may be made of feathers, or any other of the materials usually employed in making artificial flies.

In all cases the flexible portions $e f$ of the fly spring from or are attached to the forward end of the body $d$ and the hook-shank $b'$, or, in other words, these flexible parts are attached to or spring from the end of the hook which is most distant from the bend or curve $b$. In this respect my improved fly is similar to those heretofore most generally used, and the attachment of the flexible portions to the forward end of the body, or that end which is most distant from the bend or curve of the hook, is advantageous, because when the fly is drawn through the water and such flexible portions are bent backward toward the bend or curve $b$ of the hook they will not project materially beyond such bend or curve, and therefore the fish in striking the fly is almost certain to catch the hook. In this respect my improved fly and those most commonly heretofore used are fully distinguished from a fly having its wings and other flexible portions attached to and springing from the body of the fly at the rear end, which is adjacent to and nearest the bend or curve of the hook, for in this latter construction the flexible portions of the fly when deflected backward by the drawing of the fly through the water will project so far in rear of the bend or curve of the hook that the fish is very likely to strike the fly and entirely miss the hook.

In those flies heretofore made, and in which the flexible portions are attached to and spring from the forward end of the body, or that end which is most distant from the bend or curve of the hook, the flexible portions have, in their normal condition, had a rearward inclination, as indicated by the dotted line $s$ in Fig. 1, and, consequently, when the fly was drawn through the water such flexible portions would fold down closely upon and hug the body $d$, and the fly would lose its life-like appearance.

According to my invention the flexible portions, in their normal condition, instead of being inclined rearward at an acute angle relatively to the body $d$, stand at a right angle or at an obtuse angle relatively to the body, and with a forward inclination, as shown in the drawings. Where the flexible portions $e f$ have little stiffness and are not highly elastic, the angle of forward inclination may be very considerable, as shown in Fig. 1, such wing portions $e$ there shown forming a wide obtuse angle with the body $d$. Where the flexible portions of the fly are comparatively stiff and highly elastic, they may, in their normal condition, be attached so as to spring from the body at nearly a right angle thereto, as shown in Fig. 2, the wing portions in said figure forming, with the body, an obtuse angle but little greater than a right angle. The angle of forward inclination of the flexible portions of the fly will in all cases be varied proportionately to the stiffness and elasticity of such flexible portions, and it is my intention to so attach the flexible portions that they will not, when the fly is drawn through the water, be deflected rearward beyond the normal position of the flexible portions in the flies heretofore made. As the fly-hook is drawn ahead through the water by jerks, the flexible wing portions $e$ will receive a forward and backward vibration which will closely resemble the movement of the wings of a live insect, and the flexible portions will never lie back close upon the body, as in the ordinary flies having flexible portions secured, as are mine, at the end of the body most distant from the bend or curve of the hook.

I am aware that it is not new to provide a hook with wing portions which are intended to represent the wings of an insect, secured to the body of the hook at the curve or bend thereof and inclined backward so as to form an acute angle with the body; and I do not seek to cover such a fly-hook as included in my invention.

What I claim as my invention, and desire to secure by Letters Patent, is—

1. In an artificial fly or fly-hook, the combination, with the hook proper, having on its shank or stem an imitation of the body of a fly, of the wing portions springing from the forward end of the body which is most distant from the curve or bend of the hook, at an angle to the body as great or greater than a right angle, as distinguished from a fly in which the wing portions are inclined rearward and along the body from said end, substantially as and for the purpose herein described.

2. In an artificial fly or fly-hook, the combination, with the hook proper, having on its shank or stem an imitation of the body of a fly, of the flexible portions, representing the wings and hackle, springing from the forward end of the body which is most distant from the bend or curve of the hook, and inclining forward, so as to form an obtuse angle with the body, substantially as and for the purpose herein described.

THOMAS BATE MILLS.

Witnesses:
 FREDK. HAYNES,
 C. HALL.